UNITED STATES PATENT OFFICE.

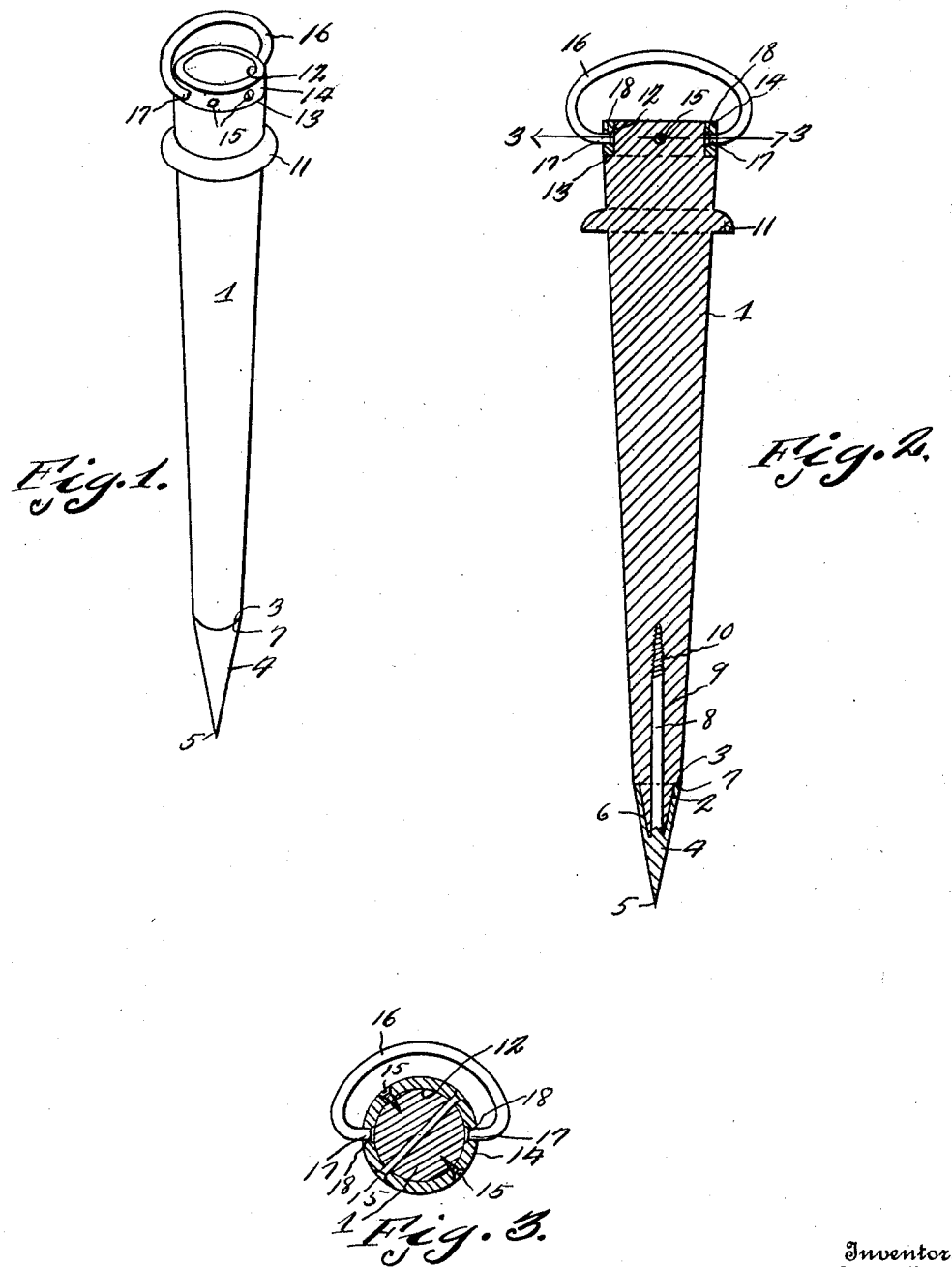

BERNARD McAULEY BRADFORD AND JOSEPH FRANCES LE GERE, OF HOPE MILLS, NORTH CAROLINA.

TETHERING PIN OR STAKE.

1,385,859. Specification of Letters Patent. Patented July 26, 1921.

Application filed February 21, 1918. Serial No. 218,595.

*To all whom it may concern:*

Be it known that we, BERNARD M. BRADFORD and JOSEPH F. LE GERE, citizens of the United States, residing at Hope Mills, in the county of Cumberland, State of North Carolina, have invented a new and useful Tethering Pin or Stake; and we do hereby declare the following to be a full, clear, and exact description of the invention, such as will enable others skilled in the art to which it appertains to make and use the same.

This invention relates to an improved tethering pin or stake, and an object of the invention is to provide a device of this kind particularly adapted for attaching animals thereto by means of a rope or tether.

A further object of the invention is to provide a simple, efficient, and inexpensive device of this kind, and which is practical in construction and comprises improved features of construction.

Another feature of the invention is the provision of a band fitting a reduced part at the upper end of the body of the stake and secured by screws, and to which band the end parts of a metallic loop are swivelly connected, whereby said metallic loop may be used for carrying the stake, or to which the tether or rope may be connected, for attaching or anchoring an animal in the field.

In practical fields the details of construction may necessitate alterations falling within the scope of what is claimed.

The invention comprises further features and combination of parts as hereinafter set forth, shown in the drawings and claimed.

In the drawings:—

Figure 1 is a perspective view of the tethering pin or stake constructed in accordance with the invention.

Fig. 2 is a vertical sectional view through the same.

Fig. 3 is a sectional view on line 3—3 of Fig. 2.

Referring more especially to the drawings, 1 designates the body of the stake, which is conical or tapered from its upper end to its lower end as shown. The lower end or extremity has a reduced part 2, which is tapered or conical, and an adjoining shoulder 3. Fitting the reduced part 2 is a metallic collar 4, which is conical or tapered to a sharp point 5, and is provided with a conical hollow portion 6 fitting the tapered part 2, so that the marginal edge 7 of the tapered collar may engage the shoulder 3. The bottom of the tapered hollow portion has a stem 8, which passes into the cylindrical bore 9. This stem has its end provided with threads 10, which are threaded to the upper end of the bore 9 as shown thereby acting as retaining means to hold the tapered collar to the stake or tethering pin. This tapered collar acts as means to pierce its way into the ground or soil, whereby the stake or tethering pin may be driven into the ground. Adjacent the upper end of the body of the pin or stake is formed an annular rib or ridge 11, which extends radially from the pin or stake and acts as means to prevent the tether or rope (not shown, which is tied about the stake) from slipping off the upper end. The extreme upper end of the tethering pin or stake has a reduced part 12 and an adjoining shoulder 13. Secured to and fitting the reduced part 12 is a band or cuff or collar 14, constructed in any suitable manner and designed to engage the shoulder 13. Diametrically opposed screws 15 are passed through the band or cuff 14 and threaded into the upper end of the stake, in fact into the reduced part, thereby securing the band 14 in place. A metallic loop 16 has its end portions 17 swiveled at 18 into diametrically opposite portions of the band 14, so that the loop 16 may be moved or pivoted to one side or the other. If desired the stake or tethering pin may be driven into the ground until the ridge or rib engages the upper surface, and in this case the tether or rope may be attached to the loop 16 instead of below the ridge or rib. In this manner the loop may toss or move from one side to the other on its swiveled connections with the band 14, in order to enable the animal to have free movement in grazing without entangling the tether or rope about the stake.

The invention having been set forth what is claimed as new and useful is:—

In a loop for a tethering pin, the combination with a tethering pin body provided with a reduced cylindrical portion at one end, of a band fitting said reduced portion, means for securing the band to the reduced portion, said band having diametrically disposed openings, a semi-circular loop having its body portion concentric with the outer face of the band, thereby being equally spaced from said band throughout its length, the opposite ends of said loop being loosely fitted in said openings, said semicircular loop having its ends curved to its pivotal point whereby as an animal walks around the tethering pin a line secured to said loop will slide from one end of the loop to the other and pivot the loop from one side to the other thereby preventing the tethering line from becoming wound around the tethering pin.

In testimony whereof we have signed our names to this specification in the presence of two subscribing witnesses.

BERNARD McAULEY BRADFORD, M. D.
JOSEPH FRANCES LE GERE.

Witnesses:
M. HAMILTON,
RUTH BYNUM.